United States Patent
Moazzen et al.

(10) Patent No.: US 12,548,813 B2
(45) Date of Patent: Feb. 10, 2026

(54) ADVANCED DIRECT RECYCLING METHODS FOR LITHIUM-ION BATTERIES

(71) Applicant: NISSAN NORTH AMERICA, INC., Franklin, TN (US)

(72) Inventors: Elahe Moazzen, Southfield, MI (US); Kulwinder Dhindsa, Westland, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 739 days.

(21) Appl. No.: 17/900,810

(22) Filed: Aug. 31, 2022

(65) Prior Publication Data

US 2024/0088465 A1 Mar. 14, 2024

(51) Int. Cl.
| | |
|---|---|
| H01M 10/00 | (2006.01) |
| H01M 4/505 | (2010.01) |
| H01M 4/525 | (2010.01) |
| H01M 4/62 | (2006.01) |
| H01M 10/0525 | (2010.01) |
| H01M 10/54 | (2006.01) |

(52) U.S. Cl.
CPC ........... *H01M 10/54* (2013.01); *H01M 4/505* (2013.01); *H01M 4/525* (2013.01); *H01M 4/623* (2013.01); *H01M 10/0525* (2013.01)

(58) Field of Classification Search
CPC ..... H01M 4/525; H01M 4/62; H01M 10/0525
See application file for complete search history.

(56) References Cited

U.S. PATENT DOCUMENTS

2016/0072162 A1* 3/2016 Kepler ............ H01M 6/52
209/606

FOREIGN PATENT DOCUMENTS

| CN | 106684487 A | * | 5/2017 | |
|---|---|---|---|---|
| CN | 107597004 A | * | 1/2018 | |
| CN | 110950364 A | * | 4/2020 | ............ C01D 15/06 |
| JP | 4366513 B2 | * | 11/2009 | ............ B03C 1/247 |
| KR | 20190066351 A | | 6/2019 | |
| TW | 201206358 A | * | 2/2012 | |
| TW | 201306358 A | * | 2/2013 | ............ B03D 1/006 |

OTHER PUBLICATIONS

Korzenski et al, Method for the recovery of lithium cobalt oxide from lithium ion batteries, Feb. 2013, See the Absteract. (Year: 2013).*

(Continued)

*Primary Examiner* — Tiffany Legette
*Assistant Examiner* — Monique M Wills
(74) *Attorney, Agent, or Firm* — Spencer Fane, LLP

(57) ABSTRACT

A method is provided for separating a binder from cathode active material particles. The method includes combining the binder, the cathode active material particles, water and solvent in a vessel to form a single phase. The method further includes allowing the single phase to settle and form a first phase and a second phase, and separating the first phase from the second phase. The first phase contains the solvent and the binder, and the second phase contains the water and the cathode active material particles.

20 Claims, 3 Drawing Sheets

(56) References Cited

OTHER PUBLICATIONS

Guo et al, Separating and recovering lithium and nickel cobalt manganese in positive electrode leaching solution of lithium battery comprises e.g. disassembling, discharging, and crushing waste lithium cobalt oxide battery and adding sulfuric acid, Apr. 2020,See the Absteract. (Year: 2020).*
Fang et al, A Waste Lithium Ion Battery Electrolyte Recycling Method, May 2017, See the Absteract. (Year: 2017).*
Matsuda et al, Method and Apparatus for Recovering Valuable Metals From Metal Composite Waste, Nov. 2009, See the Absteract. (Year: 2009).*
A high efficient powder material mixing device, Jan. 2018, Se the Abstract. (Year: 2018).*

* cited by examiner

ADVANCED DIRECT RECYCLING METHODS FOR LITHIUM-ION BATTERIES

BACKGROUND

Field of the Invention

The present invention generally relates to a direct recycling method for cathode material in a lithium-ion battery by separating a binder from cathode active material particles. The method includes combining the binder, the cathode active material particles, water and a solvent, which is immiscible with water and dissolves the binder, in a vessel to form an emulsion of the two phases. The method further includes allowing the emulsion to settle and form a first phase and a second phase, and separating the first phase from the second phase. The first phase contains the solvent and the binder, and the second phase contains the water and the cathode active material particles.

Background Information

Lithium-based batteries that include lithium metal anodes or lithium-based cathode material are desirable because they have a high energy density and, thus, can generate a large amount of power with a relatively thin electrode structure, thus permitting a reduction in the size of the battery as compared with other conventional batteries including anodes made of carbon or silicon.

Cathode active materials are one of the most expensive components in lithium-ion batteries. In particular, cobalt is very expensive, and there is a limited supply of other metals typically used in cathode active materials for lithium-ion batteries, such as lithium nickel manganese cobalt oxide ($LiNiMnCoO_2$, also commonly referred to as "NMC"). Therefore, it is desirable to recycle cathode active materials once the batteries have been used by separating the cathode active material from a binder, such as polyvinylidene fluoride ("PVDF"), in order to obtain clean cathode active material for use in a new battery.

Conventional recycling methods involve separating the cathode active material from the binder using a large amount of solvent, then replenishing the lithium lost during battery cycling after the cathode active material is recovered. However, conventional solvents used to separate cathode active material and binder are both expensive and bad for the environment. Furthermore, conventional recycling methods merely separate large cathode active particles from the binder but cannot sufficiently separate the smaller cathode active material particles. Therefore, these recycling methods do not achieve a high yield of active material sufficient to justify their high cost and negative environmental effects.

Alternative methods for recycling the cathode active material also have several drawbacks. For example, one conventional recycling method, a pyrometallurgical process, involves burning or melting the whole lithium-ion battery at a high temperature. However, this method is expensive and results in a large loss of lithium which must then be replenished. Another conventional recycling method involves hydrothermal processing of the cathode using a leaching agent to leach out individual metal precursors for the cathode active material. However, once the individual metal precursors have been recovered, the cathode active material must be re-synthesized to manufacture a new cathode active material.

Therefore, further improvement is needed to sufficiently recover both the large and small cathode active material particles and to minimize the amount of solvent used in the recycling process. Furthermore, it is desirable to directly recycle the used cathode material such that additional synthesis or manufacturing of the cathode active material from the individual metal precursors is not required.

SUMMARY

It has been discovered that cathode active material particles such as NMC particles can be directly recovered, rather than recovered as individual metal elements that must be re-synthesized to form cathode active material, in a simple two-phase separation method by using a water-immiscible solvent that dissolves a binder such as PVDF. In particular, cathode sheets may be cut into pieces and directly placed in a device with both water and the solvent. Using agitation or shake-mixing, the binder may be separated from the cathode active material particles by being dissolved in the solvent while the cathode active material particles remain in the water. The water including the cathode active material particles may then be separated from the solvent including the binder. The cathode active material particles and solvent can then be further separated to recover the active material particles and recycle the solvent for use in a subsequent separation process. Alternatively, the starting material may be cathode active material particles and binder that have already been separated from the other battery components using a conventional method, rather than cathode sheets that have been cut into pieces. By using a water-immiscible solvent that dissolves the binder, a two-phase system including an aqueous phase that contains the cathode active material particles and a solvent phase that contains the binder can be established, and the aqueous and solvent phases can be easily separated from each other in a single device.

It has also been discovered that cathode active material particles can be directly recovered in a stable emulsion method by using a water-immiscible solvent and a stabilizer such as a surfactant to create stable micelles that contain the dissolved binder and the solvent. In particular, cathode active material particles may be separated from a binder by adding water, a surfactant and the stabilizer to a single device and mixing or agitating the components in the device to form an aqueous phase containing the micelles and the cathode active material particles. The micelles are then separated from the cathode active material particles using, for example, a solid extractant, a precipitating agent or a membrane. The cathode active material particles may be recovered alone or with the water and then dried to remove the water. By using a stabilizer that creates micelles containing the binder and the solvent, the cathode active material particles can be easily separated from the binder in a single device.

Furthermore, by using a stabilizer to separate the binder from the cathode active material particles, the binder has more time in contact with the solvent, more time to dissolve and complete the reaction and, thus, may be better separated from the cathode active material particles as compared with the simple two-phase separation method. However, the stable emulsion method requires an extra separation step as compared with the simple two-phase separation method and, thus, is more complex.

Therefore, it is desirable to provide a method for directly recycling the cathode active material of a used battery by separating the spent cathode active material particles from a binder using the simple two-phase separation method with a water-immiscible solvent or the stable emulsion method with a water-immiscible solvent and a stabilizer.

In view of the state of the known technology, one aspect of the present disclosure is to provide a method of fully separating a binder from cathode active material particles active material regardless of particle size with minimal use of solvents which is more environmentally friendly and cost effective than other solvent-based methods. The method includes: combining the binder, the cathode active material particles, water and solvent in a vessel to form a single phase, allowing the single phase (emulsion) to settle and form a first phase and a second phase, and separating the first phase from the second phase. The first phase contains the solvent and the binder, and the second phase containing the water and the cathode active material particles.

Another aspect of the present disclosure is to provide a method of separating a binder from cathode active material particles. The method includes: combining the binder, the cathode active material particles, water, a solvent and a stabilizer in a vessel to form micelles, the micelles including the binder and the solvent, and separating the water and the cathode active material particles from the micelles.

By using a water-immiscible solvent that dissolves the binder in the two-phase method, a system including an aqueous phase that contains the cathode active material particles and a solvent phase that contains the binder can be established, and the aqueous and solvent phases can be easily separated from each other in a single device. Alternatively, by using a water-immiscible solvent and a stabilizer that creates micelles containing the binder and the solvent, the cathode active material particles can also be easily separated from the binder in a single device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
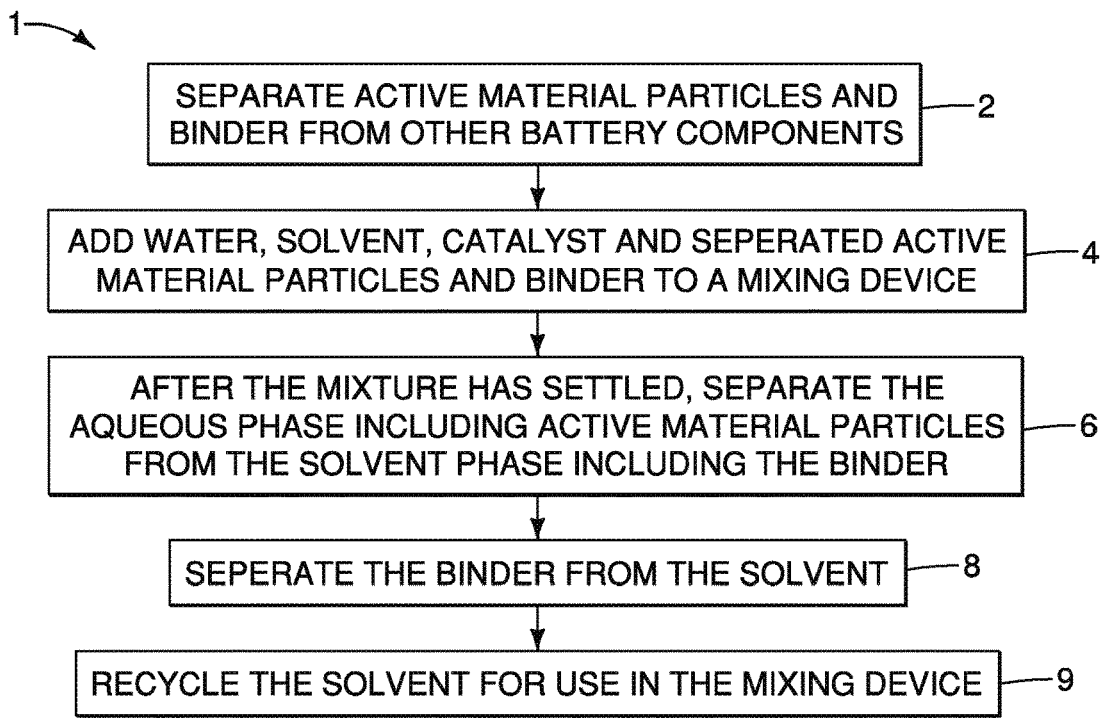
FIG. 1 is an illustrated flow chart showing a process of separating cathode active material particles from a binder according to a first embodiment.

Referring initially to FIG. 1, a process 1 of separating cathode active material particles from a binder of a lithium-ion battery is illustrated in accordance with a first embodiment. The lithium-ion battery includes a cathode, an anode and an electrolyte and may also include a cathode current collector and an anode current collector. The lithium-ion battery may be any suitable lithium-ion battery and can be incorporated in a vehicle, a mobile device, a laptop computer or other suitable personal electronic device.

The cathode active material particles may be any suitable cathode active material particles that are compatible with an electrolyte for a lithium-ion battery. For example, the cathode active material particles may be formed of a lithium transition metal oxide such as NMC or lithium cobalt oxide, lithium phosphate, lithium iron phosphate or a mixture thereof. The cathode active material particles are preferably formed of NMC. The cathode active material particles in the lithium-ion battery have a diameter of approximately 15 nm to 20 μm.

The binder may be any suitable electrode binder material. For example, the binder may include PVDF, polytetrafluoroethylene, styrene-butadiene rubber, a cellulose material or any combination thereof. The binder is preferably formed of PVDF.

In Step 2, the cathode active material particles and the binder are separated from the other components of the lithium-ion battery. For example, the cathode active material particles and the binder may be separated from the other battery components by shredding the used battery, physically separating the cathode from the other battery components such as the anode or the cathode current collector, and cutting the cathode sheet into pieces. Alternatively, the cathode active material particles and the binder may be separated from the other components of the battery using any conventional chemical or physical method.

In Step 4, the separated cathode active material particles and binder are added to a mixing device, along with water, solvent and optionally a catalyst to form a mixture. The water may be added in any suitable amount sufficient to create an aqueous phase containing the cathode active material particles. For example, water may be added in an amount of approximately 20 ml per mg of cathode active material particles to 30 ml per mg of cathode active material particles. The amount of water and solvent may vary with type of chemistry and particle size of cathode material.

The solvent may be any suitable solvent that is entirely or substantially immiscible in water. For example, the solvent may be cyclohexane, cyclopentanone, 3-heptanone, kerosene oil, N,N,N',N'-tetrabutylsuccindiamide ("TBSA"), or any mixture thereof. The solvent is preferably entirely immiscible in water in order to obtain a better separation between the aqueous phase and the solvent phase in this separation method 1. The solvent may be added in any suitable amount sufficient to dissolve the binder and create a solvent phase containing the binder. For example, the solvent may be added in an amount of approximately 5 ml per mg of binder to 10 ml per mg of binder.

The catalyst may be present for more efficient reaction and may be any suitable catalyst for weakening the chemical bonds in the binder, for example the carbon-fluoride (C—F) bonds in PVDF. For example, the catalyst may be a pincer ligated iridium complex having the below formula:

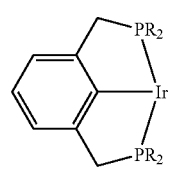

Alternatively, the catalyst may be a thiolate having a polysulfide anion. In the process 1 of FIG. 1, the catalyst is added directly to the mixing device along with the water, solvent and separated cathode active material particles and binder. However, it should be understood that the catalyst may instead be used to pre-treat the cathode or the separated cathode active material particles and binder before they are added to the mixing device.

The mixing device is any suitable single device configured to mix, agitate, ultrasonically vibrate, and/or thermally treat the material(s) within the device. For example, the mixing device may include a physical mixer such as a stirring rod or a magnet and is any suitable single-unit device. The mixture may be mixed, agitated, ultrasonically vibrated and/or thermally treated after the materials are added to the device.

In Step 6, after the mixture has settled, a two-phase system is formed including an aqueous phase and a separate solvent phase. The aqueous phase contains the water and the cathode active material particles that were added to the mixing device. The solvent phase contains the solvent, the binder and the catalyst.

The aqueous phase, which contains the water and cathode active material particles, is then separated from the solvent phase, which contains the binder. The aqueous phase and the solvent phase may be separated in any suitable manner. For example, the aqueous phase may be drawn out of the device through a bottom outlet in the mixing device while the solvent phase is drawn out of the device via a top outlet in the mixing device, or vice versa.

The cathode active material particles may be separated from the water in the aqueous phase by drying the water in the aqueous phase, for example, by heating the aqueous phase to vaporize the water. The recovered cathode active material particles may then be replenished with lithium for use in a new lithium-ion battery.

In Step 8, the binder in the solvent phase is separated from the solvent. The binder may be separated from the solvent in any suitable manner. For example, the binder may be separated from the solvent by evaporating the solvent and condensing back the solvent for recycling. The catalyst may also optionally be separated from the solvent in this step.

In Step 9, the recovered solvent is recycled back to the mixing device for use in a subsequent separation process.

Figure 2:
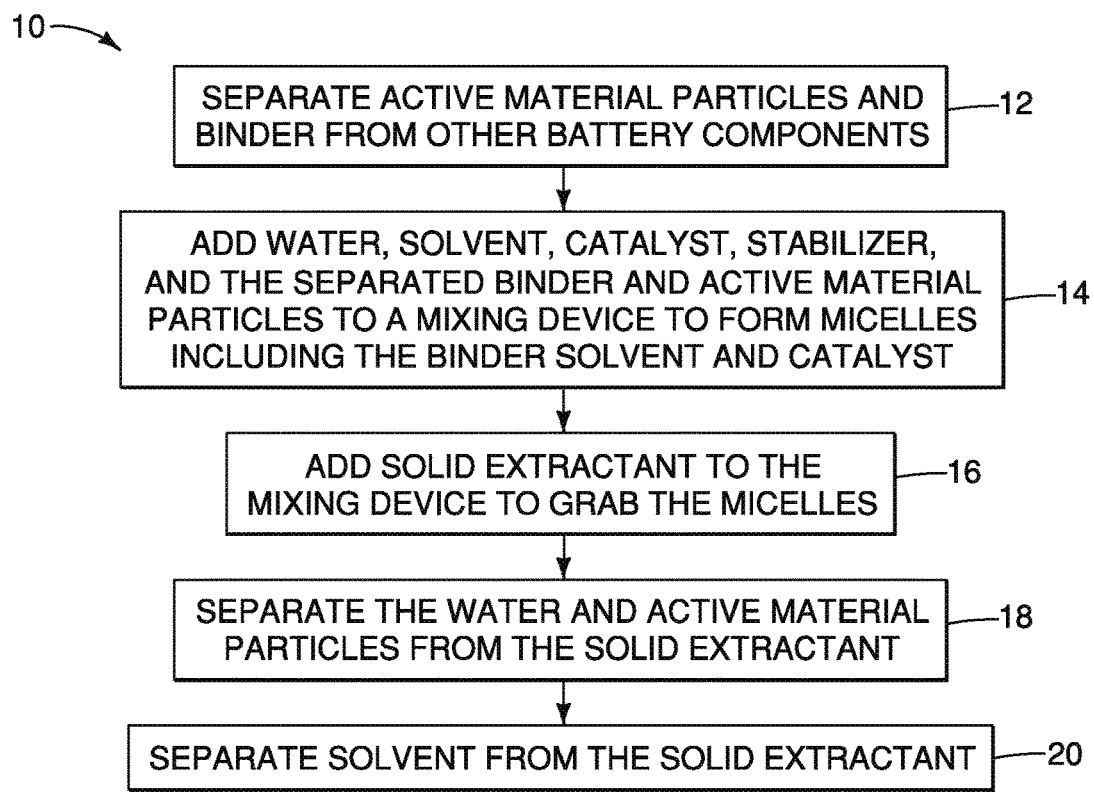
FIG. 2 is an illustrated flow chart showing a process of separating cathode active material particles from a binder according to a second embodiment.

FIG. 2 shows a process 10 of separating cathode active material particles from a binder of a lithium-ion battery in accordance with a second embodiment. The lithium-ion battery includes a cathode, an anode and an electrolyte and may also include a cathode current collector and an anode current collector. The lithium-ion battery may be any suitable lithium-ion battery and can be incorporated in a vehicle, a mobile device, a laptop computer or other suitable personal electronic device.

As with the first embodiment, the cathode active material particles of the second embodiment may be any suitable cathode active material particles that are compatible with an electrolyte for a lithium-ion battery. For example, the cathode active material particles may be formed of a lithium transition metal oxide such as NMC or lithium cobalt oxide, lithium phosphate, lithium iron phosphate or a mixture thereof. The cathode active material particles are preferably formed of NMC. The cathode active material particles in the lithium-ion battery have a diameter of approximately 15 nm to 20 μm.

The binder may be any suitable electrode binder material. For example, the binder may include PVDF, polytetrafluoroethylene, styrene-butadiene rubber, a cellulose material or any combination thereof. The binder is preferably formed of PVDF.

In Step 12, the cathode active material particles and the binder are separated from the other components of the lithium-ion battery. For example, the cathode active material particles and the binder may be separated from the other battery components by shredding the used battery, physically separating the cathode from the other battery components such as the anode or the cathode current collector, and cutting the cathode sheet into pieces. Alternatively, the cathode active material particles and the binder may be separated from the other components of the battery using any conventional chemical or physical method.

In Step 14, the separated cathode active material particles and binder are added to a mixing device, along with water, solvent, a catalyst and a stabilizer to form micelles including the binder, the solvent and the catalyst. The water may be added in any suitable amount. For example, water may be added in an amount of approximately 20 ml per mg of cathode active material particles to 30 ml per mg of cathode active material particles. The amount of water and solvent may vary with type of chemistry and particle size of cathode material.

The solvent may be any suitable solvent that is entirely or substantially immiscible in water. For example, the solvent may be cyclohexane, cyclopentanone, 3-heptanone, kerosene oil, N,N,N',N'-tetrabutyisuccindiarnide ("TBSA"), or any mixture thereof. The solvent is preferably entirely immiscible in water. The solvent may be added in any suitable amount. For example, the solvent may be added in an amount of approximately 5 ml per mg of binder to 10 ml per mg of binder.

The catalyst may be any suitable catalyst for weakening the carbon-fluoride (C—F) bonds in PVDF. For example, the catalyst may be a pincer ligated iridium complex having the below formula:

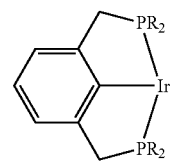

Alternatively, the catalyst may be a thiolate having polvsulfide anion. In the process 10 of FIG. 2, the catalyst is added directly to the mixing device along with the water, solvent, stabilizer and separated cathode active material particles and binder. However, it should be understood that the catalyst may instead be used to pre-treat the cathode or the separated cathode active material particles and binder before they are added to the mixing device.

The stabilizer may be any suitable material for forming micelles including the binder, the solvent and the catalyst. For example, the stabilizer may be an anionic or cationic surfactant, an amphoteric surfactant or a non-ionic surfactant. Examples of suitable surfactants include sodium lauryl sulfate ("SDS"), cetyl trimeihylammonium bromide ("CTAB"), Triton X-100, X-114, CHAPS, DOC, NP-40, and milder detergents such as octyl thioglucoside, octyl glucoside and dodecyl maltoside. The stabilizer may be added to the mixing device in any suitable amount to form the micelles. The micelles may be formed to have any suitable size sufficient to contain the solvent, the binder and the catalyst.

The mixing device is any suitable single device configured to mix, agitate, ultrasonically vibrate, and/or thermally treat the material(s) within the device. For example, the mixing device may include a physical mixer such as a stirring rod or a magnet and is any suitable single-unit device. The mixture may be mixed, agitated, ultrasonically vibrated and/or thermally treated after the materials are added to the device.

In Step 16, a solid extractant is added to the mixing device to grab the micelles. The solid extractant may be any suitable solid extractant for bonding to the micelles. For example, the solid extractant may be mesoporous silica, magnetic iron oxide ($Fe_3O_4$) particles, or any other suitable functionalized nanoparticles in which the surface of the nanoparticles is functionalized with some functional groups which have affinity to the micelle surface groups. For example, if cationic surfactant has been used as a stabilizer, the surface of the micelles is positively charged and, thus, the surface of the nanoparticle extractants should be functionalized with negatively charged groups. Furthermore, the solid extractant may optionally be functionalized by the catalyst or any other material having an affinity with the binder to break the bonds of the binder. The solid extractant may be added to the mixing device in any suitable amount for grabbing the micelles. For example, the solid extractant may be added in a suitable amount of relative to an amount of binder. For example, the amount of solid extractant should be calculated based on the volume of the micelles to be collected, the porosity of the extractant, or in general the adsorption capacity of the solid extractants. The resulting mixture includes the cathode active material particles being separated from the solid extractant in the water, with the solid extractant including the micelles containing the solvent, the binder and the catalyst.

In Step 18, the water and cathode active material particles are separated from the solid extractant. The water and cathode active material particles may be separated from the solid extractant in any suitable manner. For example, if the solid extractant is magnetic, the solid extractant can be separated from the water and the cathode active material particles using a magnet to draw out the solid extractant from the water. The magnet may be provided inside of or exterior to the mixing device.

The cathode active material particles may further be separated from the water by drying the water, for example, by heating the water containing the cathode active material particles to vaporize the water. The recovered cathode active material particles may then be replenished with lithium for use in a new lithium-ion battery.

In Step 20, the solvent is separated from the solid extractant. The solvent may be separated from the solid extractant in any suitable manner. For example, if some functional groups are used to capture the micelles on the nanoparticles or on the surface of the pores in the porous materials, the micelles could be released by adjusting the pH of the mixture, washing the extractant by adding a reagent that has a greater affinity to the micelles than the solid extractant, or simply evaporating the solvent from the solid extractant and condensing the solvent back for recycling. The catalyst may also optionally be separated from the solvent and binder and recovered for reuse.

Figure 3:
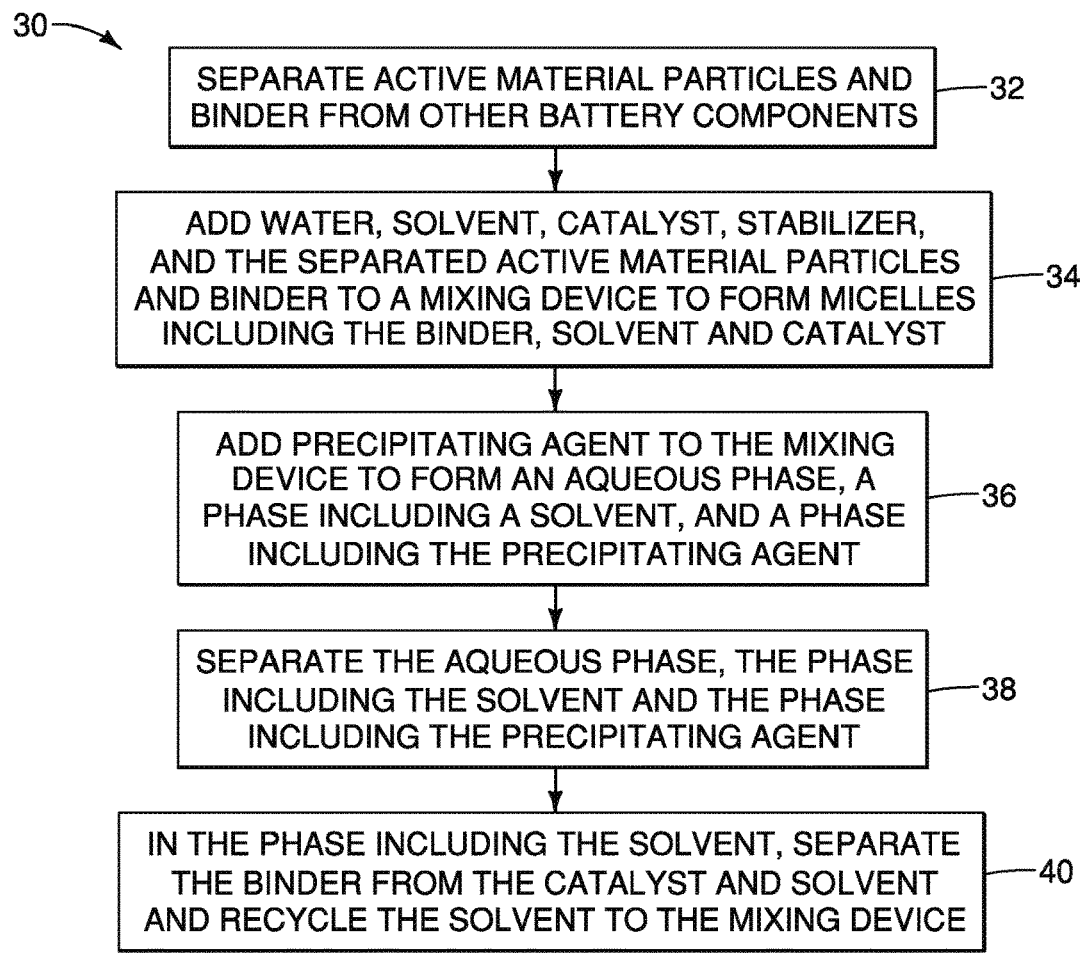
FIG. 3 is an illustrated flow chart showing a process of separating cathode active material particles from a binder according to a third embodiment.

FIG. 3 illustrates a process 30 of separating cathode active material particles from a binder of a lithium-ion battery in accordance with a third embodiment. The lithium ion battery includes a cathode, an anode and an electrolyte and may also include a cathode current collector and an anode current collector. The lithium-ion battery may be any suitable lithium-ion battery and can be incorporated in a vehicle, a mobile device, a laptop computer or other suitable personal electronic device.

As with the first and second embodiments, the cathode active material particles of the third embodiment may be any suitable cathode active material particles that are compatible with an electrolyte for a lithium-ion battery. For example, the cathode active material particles may be formed of a lithium transition metal oxide such as NMC or lithium cobalt oxide, lithium phosphate, lithium iron phosphate or a mixture thereof. The cathode active material particles are preferably formed of NMC. The cathode active material particles in the lithium-ion battery have a diameter of approximately 15 nm to 20 μm.

The binder may be any suitable electrode binder material. For example, the binder may include PVDF, polytetrafluoroethylene, styrene-butadiene rubber, a cellulose material or any combination thereof. The binder is preferably formed of PVDF.

In Step 32, the cathode active material particles and the binder are separated from the other components of the lithium-ion battery. For example, the cathode active material particles and the binder may be separated from the other battery components by shredding the used battery, physically separating the cathode from the other battery components such as the anode or the cathode current collector, and cutting the cathode sheet into pieces. Alternatively, the cathode active material particles and the binder may be separated from the other components of the battery using any conventional chemical or physical method.

In Step 34, the separated cathode active material particles and binder are added to a mixing device, along with water, solvent, a catalyst and a stabilizer to form micelles including the binder, the solvent and the catalyst. The water may be added in any suitable amount. For example, water may be added in an amount of approximately 20 ml per mg of cathode active material particles to 50 ml per mg of cathode active material particles.

The solvent may be any suitable solvent that is entirely or substantially immiscible in water. For example, the solvent may be cyclohexane, cyclopentanone, 3-heptanone, kerosene oil, N,N,N',N'-tetrabutylsuccindiamide ("TBSA"), or any mixture thereof. The solvent is preferably entirely immiscible in water. The solvent may be added in any suitable amount. For example, the solvent may be added in an amount of approximately 5 ml per mg of binder to 10 ml per mg of binder.

The catalyst may be any suitable catalyst for weakening the carbon-fluoride (C—F) bonds in PVDF. For example, the catalyst may be a pincer ligated iridium complex having the below formula:

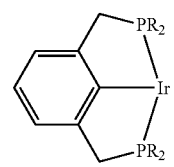

Alternatively, the catalyst may be a thiolate having a polysulfide anion. In the process 30 of FIG. 3, the catalyst is added directly to the mixing device along with the water, solvent, stabilizer and separated cathode active material particles and binder. However, it should be understood that the catalyst may instead be used to pre-treat the cathode or the separated cathode active material particles and binder before they are added to the mixing device.

The stabilizer may be any suitable material for forming micelles including the binder, the solvent and the catalyst. For example, the stabilizer may be an anionic or cationic surfactant, an amphoteric surfactant or a non-ionic surfactant. Examples of suitable surfactants include SDS, CTAB, Triton X-100, X-114, CHAPS, DOC, NP-40, and milder detergents such as octyl thioglucoside, octyl glucoside and dodecyl maltoside. The stabilizer may be added to the mixing device in any suitable amount to form the micelles. The micelles may be formed to have any suitable size sufficient to contain the solvent, the binder and the catalyst.

The mixing device is any suitable single device configured to mix, agitate, ultrasonically vibrate, and/or thermally treat the material(s) within the device. For example, the mixing device may include a physical mixer such as a stirring rod or a magnet and is any suitable single-unit device. The mixture may be mixed, agitated, ultrasonically vibrated and/or thermally treated after the materials are added to the device.

In Step 36, a precipitating agent is added to the mixing device to form a three-phase system including an aqueous phase, a solvent phase and a phase containing the precipitating agent. The solvent phase includes the binder, the catalyst and the solvent.

The precipitating agent is selected to react with either the cathode active material particles or the stabilizer. If the precipitating anent is configured to react with the stabilizer, the precipitating agent causes the stabilizer to agglomerate and form a phase that is heavier than both the aqueous phase and the solvent phase. Alternatively, if the precipitating agent is configured to react with the cathode active material particles, the precipitating agent reacts with the surface of the cathode active material particles and causes the cathode active material particles to agglomerate and form a phase that is heavier than both the aqueous phase and the solvent phase.

The precipitating agent may be any suitable precipitating agent for causing the cathode active material particles or the stabilizer to agglomerate. For example, the precipitating agent may be 1-octanol, ethanol or any mixture thereof. The precipitating agent may be added to the mixing device in any suitable amount for creating a heavy phase containing the precipitating agent and either the stabilizer or the cathode active material particles.

In Step 38, the aqueous phase, the solvent phase and the heavy phase containing the precipitating agent and either the stabilizer or the cathode active material particles are all separated from each other. For example, the heavy phase containing the precipitating agent is separated by gravity from the aqueous phase and the solvent phase.

If the heavy phase containing the precipitating agent also contains the stabilizer rather than the cathode active material particles, the cathode active material particles are contained with the water in the aqueous phase. In this case, the water and cathode active material particles may further be separated from the water by drying the water, for example, by heating the water containing the cathode active material particles to vaporize the water. The recovered cathode active material particles may then be replenished with lithium for use in a new lithium-ion battery.

However if the heavy phase containing the precipitating agent also contains the cathode active material particles, further processing must be performed to separate the cathode active material particles from the precipitating agent. The recovered cathode active material particles may then be replenished with lithium for use in a new lithium-ion battery.

In Step 40, the solvent phase is further process to separate the binder from the catalyst and the solvent. The solvent may be separated from the binder and the catalyst in any suitable manner. For example, the solvent can be evaporated and condensed for recycling. The recovered solvent may then by recycled to the mixing device for use in a subsequent separation process.

Figure 4:
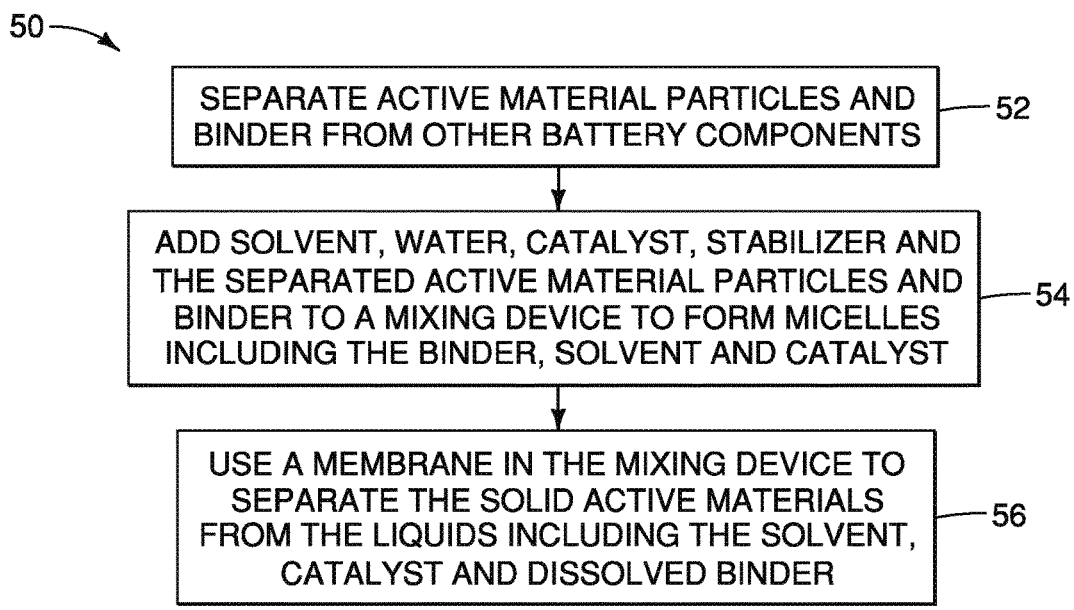
FIG. 4 is an illustrated flow chart showing a process of separating cathode active material particles from a binder according to a fourth embodiment.

FIG. 4 shows a process 50 of separating cathode active material particles from a binder of a lithium-ion battery in accordance with a fourth embodiment. The lithium-ion battery includes a cathode, an anode and an electrolyte and may also include a cathode current collector and an anode current collector. The lithium-ion battery may be any suitable lithium-ion battery and can be incorporated in a vehicle, a mobile device, a laptop computer or other suitable personal electronic device.

As with the first, second and third embodiments, the cathode active material particles of the fourth embodiment may be any suitable cathode active material particles that are compatible with an electrolyte for a lithium-ion battery. For example, the cathode active material particles may be formed of a lithium transition metal oxide such as NMC or lithium cobalt oxide, lithium phosphate, lithium iron phosphate or a mixture thereof. The cathode active material particles are preferably formed of NMC. The cathode active material particles in the lithium-ion battery have a diameter of approximately 15 nm to 20 µm.

The binder may be any suitable electrode binder material. For example, the binder may include PVDF, polytetrafluoroethylene, styrene-butadiene rubber, a cellulose material or any combination thereof. The binder is preferably formed of PVDF.

In Step 52, the cathode active material particles and the binder are separated from the other components of the lithium-ion battery. For example, the cathode active material particles and the binder may be separated from the other battery components by shredding the used battery, physically separating the cathode from the other battery components such as the anode or the cathode current collector, and cutting the cathode sheet into pieces. Alternatively, the cathode active material particles and the binder may be separated from the other components of the battery using any conventional chemical or physical method.

In Step 54, the separated cathode active material particles and binder are added to a mixing device, along with water, solvent, a catalyst and a stabilizer to form micelles including the binder, the solvent and the catalyst. The water may be added in any suitable amount. For example, water may be added in an amount of approximately 20 ml per mg of cathode active material particles to 50 ml per mg of cathode active material particles.

The solvent may be any suitable solvent that is entirely or substantially immiscible in water. For example, the solvent may be cyclohexane, cyclopentanone, 3-heytanone, kerosene oil, N,N,N',N'-tetrabutylsuccindiamide ("TBSA"), or any mixture thereof. The solvent is preferably entirely immiscible in water. The solvent may be added in any suitable amount. For example, the solvent may be added in an amount of approximately 5 ml per mg of binder to 10 ml per mg of binder.

The catalyst may be any suitable catalyst for weakening the carbon-fluoride (C—F) bonds in PVDF. For example, the catalyst may be a pincer ligated iridium complex having the below formula:

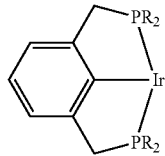

Alternatively, the catalyst may be a thiolate having polysulfide anion. In the process 50 of FIG. 4, the catalyst is added directly to the mixing device along with the water, solvent, stabilizer and separated cathode active material particles and binder. However, it should be understood that the catalyst may instead be used to pre-treat the cathode or the separated cathode active material particles and binder before they are added to the mixing device.

The stabilizer may be any suitable material for forming micelles including the binder, the solvent and the catalyst. For example, the stabilizer may be an anionic or cationic surfactant, an amphoteric surfactant or a non-ionic surfactant. Examples of suitable surfactants include SDS, CTAB, Triton X-100, X-114, CHAPS, DOC, NP-40, and milder detergents such as octyl thioglucoside, octyl glucoside and dodecyl maltoside. The stabilizer may be added to the mixing device in any suitable amount to form the micelles. The micelles may be formed to have any suitable size sufficient to contain the solvent, the binder and the catalyst.

The mixing device is any suitable single device configured to mix, agitate, ultrasonically vibrate, and/or thermally treat the material(s) within the device. For example, the mixing device may include a physical mixer such as a stirring rod or a magnet and is any suitable single-unit device. The mixture may be mixed, agitated, ultrasonically vibrated and/or thermally treated after the materials are added to the device.

In Step 56, a membrane in the mixing device is used to separate the solid cathode active material particles from the liquids, which include the water and the micelles containing the solvent, the catalyst and the binder. The membrane may be a simple filter having a size sufficient to prevent the solid cathode active material particles from flowing out with the liquid, or the membrane may be any suitable membrane for separating the liquid from the solid cathode active material particles. For example, any commercially available screen filters may be used with the pore size of the filter depending on the particle size of the cathode active material particles. The recovered cathode active material particles may then be replenished with lithium for use in a new lithium-ion battery. In addition, the liquid may be further processed to recover the solvent and recycle the solvent back to the mixing device for use in a subsequent separation process.

Figure 5:
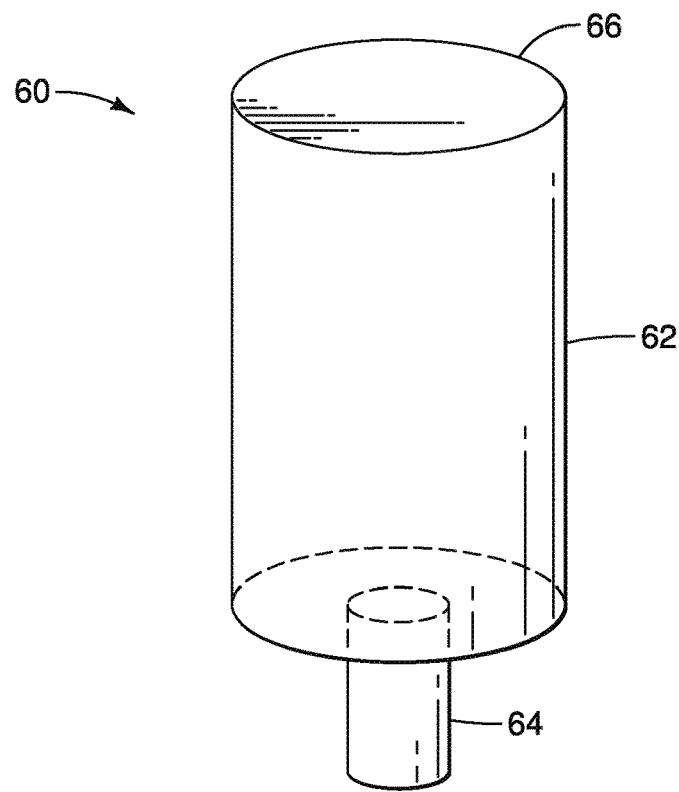
FIG. 5 is a perspective view of a device for separating cathode active material particles from a binder according to a fifth embodiment.

FIG. 5 shows a device 60 for separating cathode active material particles from a binder in accordance with a fifth embodiment. The device 60 may be any suitable single device configured to mix, agitate, ultrasonically vibrate, and/or thermally treat the material(s) within the device. For example, the mixing device may include a physical mixer such as a stirring rod or a magnet and is any suitable single-unit device. The mixture may be mixed, agitated, ultrasonically vibrated and/or thermally treated after the materials are added to the device. The device 60 may be formed of any suitable material for holding water and a water-immiscible solvent, such as glass.

As shown in FIG. 5, the device 60 includes a body 62, an outlet 64 and a top 66. The body 62 is configured to contain water, a solvent, a binder and cathode active material particles. The outlet 64 is configured and sized to allow water and cathode active material particles to flow out of the device 60. The top 66 may be a lid or any suitable top that can be opened or otherwise configured to allow solvent, binder, cathode active material particles and water to be added to the device 60.

Figure 6:
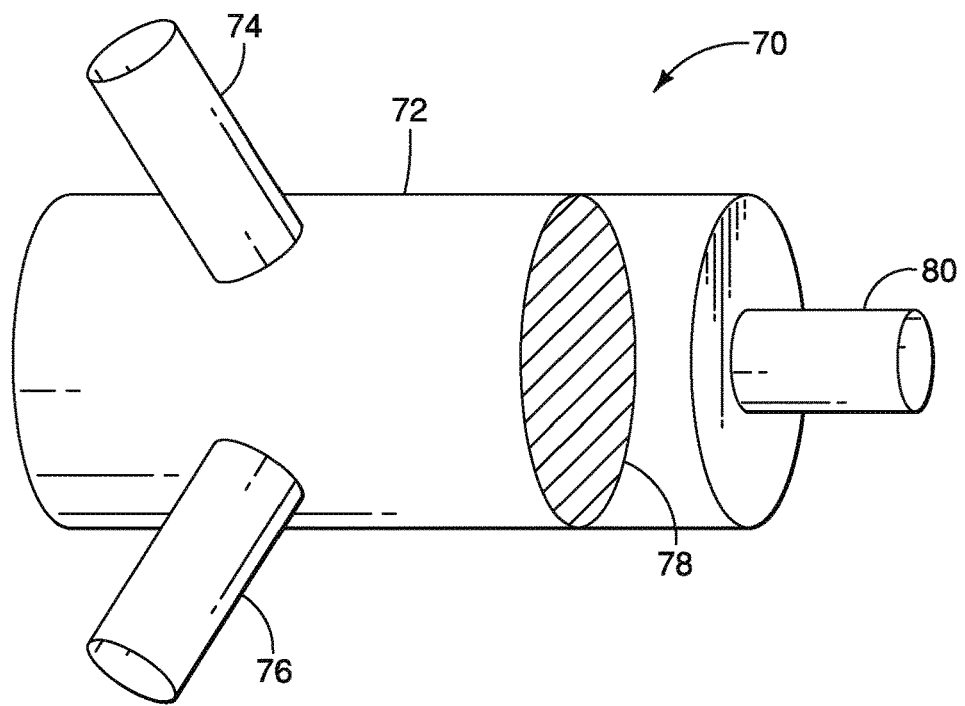
FIG. 6 is a perspective view of a device for separating cathode active material particles from a binder according to a sixth embodiment.

FIG. 6 illustrates a device 70 for separating cathode active material particles from a binder according to a sixth embodiment. The device 70 may be any suitable single device configured to mix, agitate, ultrasonically vibrate, and/or thermally treat the material(s) within the device. For example, the mixing device may include a physical mixer such as a stirring rod or a magnet and is any suitable single-unit device. The mixture may be mixed, agitated, ultrasonically vibrated and/or thermally treated after the materials are added to the device. The device 70 may be formed of any suitable material for holding water and a water-immiscible solvent, such as glass.

As shown in FIG. 6, the device 70 includes a body 72, a first inlet 74, a second inlet 76, a membrane 78 and an outlet 80. The body 72 is configured to contain water, a solvent, a binder and cathode active material particles. The first inlet 64 is configured to allow water to be added to the device 70, and the second inlet 76 is configured to allow solvent to be added to the device 70. The membrane 78 is any suitable membrane for separating a liquid from solid cathode active material particles. For example, any commercially available screen filters may be used with the pore size of the filter depending on the particle size of the cathode active material particles. The outlet 80 is configured and sized to allow water, solvent and dissolved binder to flow out of the device 80.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," or "element" when used in the singular can have the dual meaning of a single part or a plurality of parts.

The terms of degree, such as "approximately" or "substantially" as used herein, mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A method of separating a binder from cathode active material particles, the method comprising:
   combining the binder, the cathode active material particles, water and a solvent in a vessel to form a single phase;
   allowing the single phase to settle and form a two-phase liquid including a first solvent phase and a second aqueous phase; and
   separating the first solvent phase in the two-phase liquid from the second aqueous phase,
   the first solvent phase containing the solvent and the binder and the second aqueous phase containing the water and the cathode active material particles, and
   the solvent being immiscible in the water.

2. The method according to claim 1, wherein the binder comprises polyvinylidene fluoride.

3. The method according to claim 1, wherein the cathode active material particles are formed of a lithium transition metal oxide.

4. The method according to claim 3, wherein the lithium transition metal oxide is $LiNiMnCoO_2$.

5. The method according to claim 1, wherein the binder, the cathode active material particles, the water and the solvent are combined by at least one selected from the group consisting of: mixing, agitation, ultrasonic vibration, and thermal treatment.

6. The method according to claim 1, wherein the solvent is selected from the group consisting of: cyclohexane, cyclopentanone and 3-heptanone.

7. The method according to claim 1, further comprising combining a catalyst with the binder, the cathode active material particles, the water and the solvent in the vessel to form the single phase.

8. The method according to claim 1, further comprising separating the solvent from the binder and recycling the solvent after the first solvent phase has been separated from the second aqueous phase.

9. A method of separating a binder from cathode active material particles, the method comprising:
   combining the binder, the cathode active material particles, water, a solvent and a stabilizer in a vessel to form an aqueous phase containing the water, the cathode active material particles and micelles, the micelles containing the binder and the solvent; and
   separating the water and the cathode active material particles from the micelles.

10. The method according to claim 9, further comprising adding a solid extractant to the vessel to extract the micelles from the water and the cathode active material particles such that the micelles are contained in the solid extractant,
    wherein the water and the cathode active material particles are separated from the micelles by separating the water and the cathode active material particles from the solid extractant containing the micelles.

11. The method according to claim 10, wherein the solid extractant containing the micelles is separated from the water and the cathode active material particles using a magnet.

12. The method according to claim 9, further comprising adding a precipitating agent to the vessel to form a first phase containing the water, a second phase containing the solvent and the binder, and a third phase containing the precipitating agent,
    wherein the water and the cathode active material particles are separated from the micelles by separating the first phase, the second phase and third phase from each other.

13. The method according to claim 12, wherein the third phase contains the precipitating agent and one of the cathode active material particles and the stabilizer.

14. The method according to claim 9, further comprising providing a membrane in the mixing device to separate the cathode active material particles from the micelles including the binder and the solvent.

15. The method according to claim 9, wherein the binder comprises polyvinylidene fluoride.

16. The method according to claim 9, wherein the cathode active material particles are formed of $LiNiMnCoO_2$.

17. The method according to claim 9, wherein the binder, the cathode active material particles, the water and the solvent are combined by at least one selected from the group consisting of: mixing, agitation, ultrasonic vibration, and thermal treatment.

18. The method according to claim 9, wherein the solvent is selected from the group consisting of: cyclohexane, cyclopentanone and 3-heptanone.

19. The method according to claim 9, further comprising combining a catalyst with the binder, the cathode active material particles, the water and the solvent in the vessel to form the micelles, the micelles including the catalyst.

20. The method according to claim 9, wherein the stabilizer is a surfactant.

* * * * *